US008816961B2

(12) United States Patent
Buil et al.

(10) Patent No.: US 8,816,961 B2
(45) Date of Patent: Aug. 26, 2014

(54) POINTING DEVICE FOR USE ON AN INTERACTIVE SURFACE

(75) Inventors: Vincentius Paulus Buil, Eindhoven (NL); Gerrit Hollemans, Eindhoven (NL); Anthonie Hendrik Bergman, Eindhoven (NL); Johannes Henricus Maria Korst, Eindhoven (NL); Sriram Subramanian, Bristol (GB)

(73) Assignee: Koninklijke Philips N.V., Eindhoven (NL)

( * ) Notice: Subject to any disclaimer, the term of this patent is extended or adjusted under 35 U.S.C. 154(b) by 670 days.

(21) Appl. No.: 12/935,611

(22) PCT Filed: Mar. 27, 2009

(86) PCT No.: PCT/IB2009/051280
§ 371 (c)(1),
(2), (4) Date: Sep. 30, 2010

(87) PCT Pub. No.: WO2009/122331
PCT Pub. Date: Oct. 8, 2009

(65) Prior Publication Data
US 2011/0025651 A1 Feb. 3, 2011

(30) Foreign Application Priority Data
Apr. 1, 2008 (EP) .................................... 08153893

(51) Int. Cl.
*G09G 5/08* (2006.01)
(52) U.S. Cl.
USPC ................ 345/161; 345/173; 463/38; 700/85
(58) Field of Classification Search
USPC .......... 345/161, 173, 179; 74/471 R, 471 XY; 463/37, 38; 700/85; 178/18.03–18.07, 178/19.05; 715/863, 864; 382/314; D14/411–416
See application file for complete search history.

(56) References Cited

U.S. PATENT DOCUMENTS

| 5,912,662 A | 6/1999 | Bunn et al. |
| 6,522,320 B1 * | 2/2003 | Chou ............................ 345/157 |

(Continued)

FOREIGN PATENT DOCUMENTS

| EP | 1621238 A1 | 2/2006 |
| FR | 2424022 A1 | 11/1979 |

(Continued)

OTHER PUBLICATIONS

Rekimoto, J.: "Smartskin: An Infrastructure for Freehand Manipulation on Interactive Surfaces."; Proceedings of the SIGCHI Conference on Human Factors in Computing Systems, CHI 2002, 8 Page Document.

(Continued)

*Primary Examiner* — Tom Sheng

(57) ABSTRACT

A pointing device (10, 50, 70, 90) is provided for use on an interactive surface (21). The pointing device (10, 50, 70, 90) comprises a grip portion (11, 51, 71, 91) and a shapeable part (12, 52, 72, 92). The grip portion can be manipulated into different positions by a user. The shapeable part (12, 52, 72, 92) has a contact surface for making contact with the interactive surface (21). The grip portion (11, 51, 71, 91) is coupled to the shapeable part (12, 52, 72, 92) in such a way that the manipulation of the grip portion (11, 51, 71, 91) causes a footprint (30, 60, 80, 100) of the contact surface on the interactive surface (21) to take a shape corresponding to the respective different positions of the grip portion (11, 51, 71, 91).

19 Claims, 13 Drawing Sheets

(56) References Cited

U.S. PATENT DOCUMENTS

| | | |
|---|---|---|
| 6,776,546 B2 | 8/2004 | Kraus et al. |
| 7,102,615 B2 | 9/2006 | Marks |
| 7,552,402 B2 * | 6/2009 | Bilow ............................ 715/862 |
| 7,612,786 B2 * | 11/2009 | Vale et al. ...................... 345/619 |
| 8,001,613 B2 * | 8/2011 | Duncan ............................ 726/28 |
| 8,139,059 B2 * | 3/2012 | Trepte ............................ 345/426 |
| 2003/0117408 A1 | 6/2003 | Forsline et al. |
| 2005/0057535 A1 * | 3/2005 | Liu et al. ........................ 345/179 |
| 2006/0227099 A1 | 10/2006 | Han et al. |
| 2007/0300182 A1 | 12/2007 | Bilow |
| 2008/0192025 A1 * | 8/2008 | Jaeger et al. ................... 345/173 |
| 2009/0020344 A1 * | 1/2009 | Ringholz et al. ............ 178/19.05 |
| 2010/0277428 A1 * | 11/2010 | Kumazawa ................... 345/173 |

FOREIGN PATENT DOCUMENTS

| | | |
|---|---|---|
| JP | 10307677 A | 11/1998 |
| WO | 2006082547 A2 | 8/2006 |
| WO | 2006103676 A2 | 10/2006 |
| WO | 2007107239 A1 | 9/2007 |

OTHER PUBLICATIONS

Patten et al: "Sensetable: A Wireless Object Tracking Platform for Tangible User Interfaces"; Proceedings of CHI 2001, Mar. 31-Apr. 5M, 2001, ACM Press, 8 Page Document.

"Reactable"—2008 Press Release and Accompanying Description Regarding "The Reactable", A Music Synthesizer; Music Technology Group Within the Audiovisual Institue at the Universitat Pompeu Fabra in Barcelona Spain. Downloaded From http://web.archive.org/web/20088021618412rn__1/reactable.iua.upf.edu/ on Sep. 18, 2010.

* cited by examiner

POINTING DEVICE FOR USE ON AN INTERACTIVE SURFACE

FIELD OF THE INVENTION

This invention relates to a pointing device, in particular a pointing device for use with an interactive tabletop system. The pointing device comprises a grip portion for allowing manipulation into different positions by a user.

This invention further relates to an interactive system comprising an interactive surface and such a pointing device.

Finally, the invention relates to a method for determining a position of the grip portion of such a pointing device.

BACKGROUND OF THE INVENTION

Tangible objects on interactive tabletop systems are a known means to provide input to such systems. For example, on the Reactable (http://mtg.upf.edu/reactable/) from the Music Technology Group, Pompeu Fabra University, Barcelona, the size of various tangible objects is used to identify different sound generators/modifiers, and the orientation of these is used to control an input parameter (e.g., amount of contribution to the end result). Tracking is done via computer vision from beneath the table. For the Reactable, only the identity, position and orientation of the objects are input parameters, that can be manipulated for the purpose of user interaction with the system.

The SenseTable from MIT is an example where the objects, that form an input method on an interactive surface, also have a second input method on the objects themselves. The objects of the SenseTable have a dial controller on top, of which its state, plus the position of the object is tracked electromechanically. Also other input means are known, such as those described in WO2006/082547-A2: tangible objects with triggerable subparts (e.g., touch sensitive areas). Communication of these objects to an interactive tabletop is described to be done via electrode contacts, charge (capacitive touch screen), wireless RF, or IR Light.

Such known tangible objects are quite suitable for providing interaction of the tangible objects with the interactive system. The objects themselves as well as their position and their orientation can be used as input for the interactive system. The dial controller or triggerable subpart may provide additional functionality related to the object. However, such tangible objects are not very useful for providing the functionality of a general pointing device. Pointing devices, such as joysticks, mice and track balls are well known. Alternative pointing devices such as touch pads, graphics tablets or light pens are also known. Such pointing devices allow a user to input spatial (i.e. continuous and multi-dimensional) data to a computer. Pointing devices may, e.g., be used for moving a cursor through a graphical user interface (GUI). Such pointing devices may also be used in combination with interactive surfaces, e.g., by plugging the pointing devices into a computer that is used for operating the interactive display. Such pointing devices may be wired or wireless, but will always require some additional energy source to allow communication with the system.

WO 2006/103676 A2 describes a way to use tangible objects on an interactive surface to provide some functionality of a pointing device. In WO 2006/103676 A2, a very large interactive surface is provided. A user or object on the interactive surface may function as a pointing device. Two techniques are disclosed. First, the display rectangular may be mapped onto a corresponding area on the interactive surface. The position of the user on the mapped area then corresponds to a position on the display. This is very similar to the use of a graphics tablet. Second, the position of the user relative to a Point of Equilibrium may be used to indicate a direction. This technique is very similar to the use of a joystick. If the top of a joystick is moved to the left of its centre position, a cursor will move to the left. The cursor stops moving when the joystick top is back at its centre position. Because WO2006/103676 A2 only uses manipulation of the position of the user or object on the interactive surface to provide special data, the system disclosed therein is not very suitable for, e.g., playing games requiring fast and accurate manipulation of the pointing device.

It is an object of the invention to provide a pointing device for use on an interactive surface, which pointing device allows fast and accurate manipulation without requiring an additional energy source for communicating with the system.

SUMMARY OF THE INVENTION

According to a first aspect of the invention, this object is achieved by providing a pointing device for use on an interactive surface, the pointing device comprising a grip portion for allowing manipulation into different positions by a user, and a shapeable part with a contact surface for making contact with the interactive surface, the grip portion being coupled to the shapeable part in such a way that the manipulation of the grip portion into one of the different positions causes a footprint of the contact surface on the interactive surface to take a shape corresponding to the respective position of the grip portion.

Just like with a general joystick, the user manipulates the grip portion into different positions in order to provide directional commands. According to the invention, the manipulation by the users causes the footprint of the contact surface on the interactive surface to change shape. The interactive system, being able to detect the footprint, then infers the current position of the pointing device, and the directional commands of the user, from the shape of the footprint. When the grip portion is in a neutral position, the footprint has a corresponding neutral shape. The shapeable part is coupled to the grip portion. When the shapeable part is in contact with the interactive surface, changing the position of the grip portion will lead to a different shape for the shapeable part and to a different foot print on the contact surface. The footprint shape is changed by the mechanical force applied by the user and the footprint represents the position of the grip portion. The changing foot print shape is interpreted by the interactive surface to for example move a cursor on the screen in a certain direction, with a certain speed. The pointing device according to the invention does not require an energy source to provide directional commands to the interactive system. No cords or wireless communication units are needed for communicating with the interactive system.

Some preferred implementations of the shapeable part are described in the dependent claims. In one implementation, the shapeable part comprises flexible material. By manipulating the grip portion into another position, the flexible material is bent and the shape of the footprint is changed.

In another preferred implementation, the shapeable part comprises at least two rigid members, the rigid members comprising at least a part of the contact surface and being coupled to the grip portion by flexible links. By manipulation of the grip portion, the positions and/or shapes of the surface contacting points of the rigid members may change accordingly.

BRIEF DESCRIPTION OF THE DRAWINGS

These and other aspects of the invention are apparent from and will be elucidated with reference to the embodiments described hereinafter.

In the drawings.

DETAILED DESCRIPTION OF THE EMBODIMENTS

Figure 1:
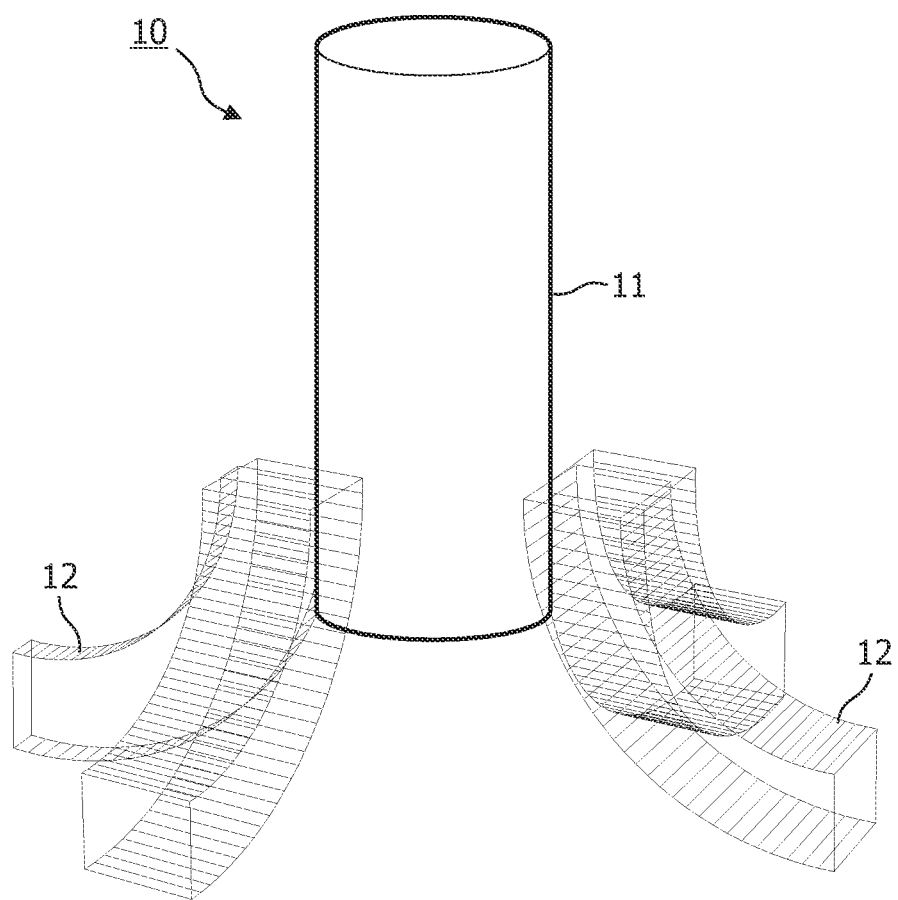
FIG. 1 shows an embodiment of the pointing device according to the invention.

FIG. 1 shows an embodiment of the pointing device 10 according to the invention. The pointing device 10 comprises a grip portion 11 for allowing manipulation into different positions. The grip 11 may have a hand profile to improve the ergonomic aspects of the pointing device 10. The grip portion 11 is preferably made of quite stiff material. Plastics that are generally used for pointing devices, such as joysticks, track balls or computer mice may be very suitable as materials for the grip portion 11. The pointing device 10 further comprises four curved legs 12 made of flexible material. The legs 12 may, for example, be made of bendable soft foam. Bendable soft foam may, for example, be polyethylene or polyurethane. The four curved legs 12 together form the shapeable part of the pointing device 10. The four legs 12 are attached to the grip portion 11. When the pointing device 10 is placed on a surface, part of the legs 12 make contact with that surface and thereby form a footprint. If the user then grips the grip portion 11 and pushes it into some direction, the flexible legs 12 will be bent and the shape of the footprint will change accordingly. This will further be elucidated with reference to FIGS. 2, 3 and 4.

Figure 2:
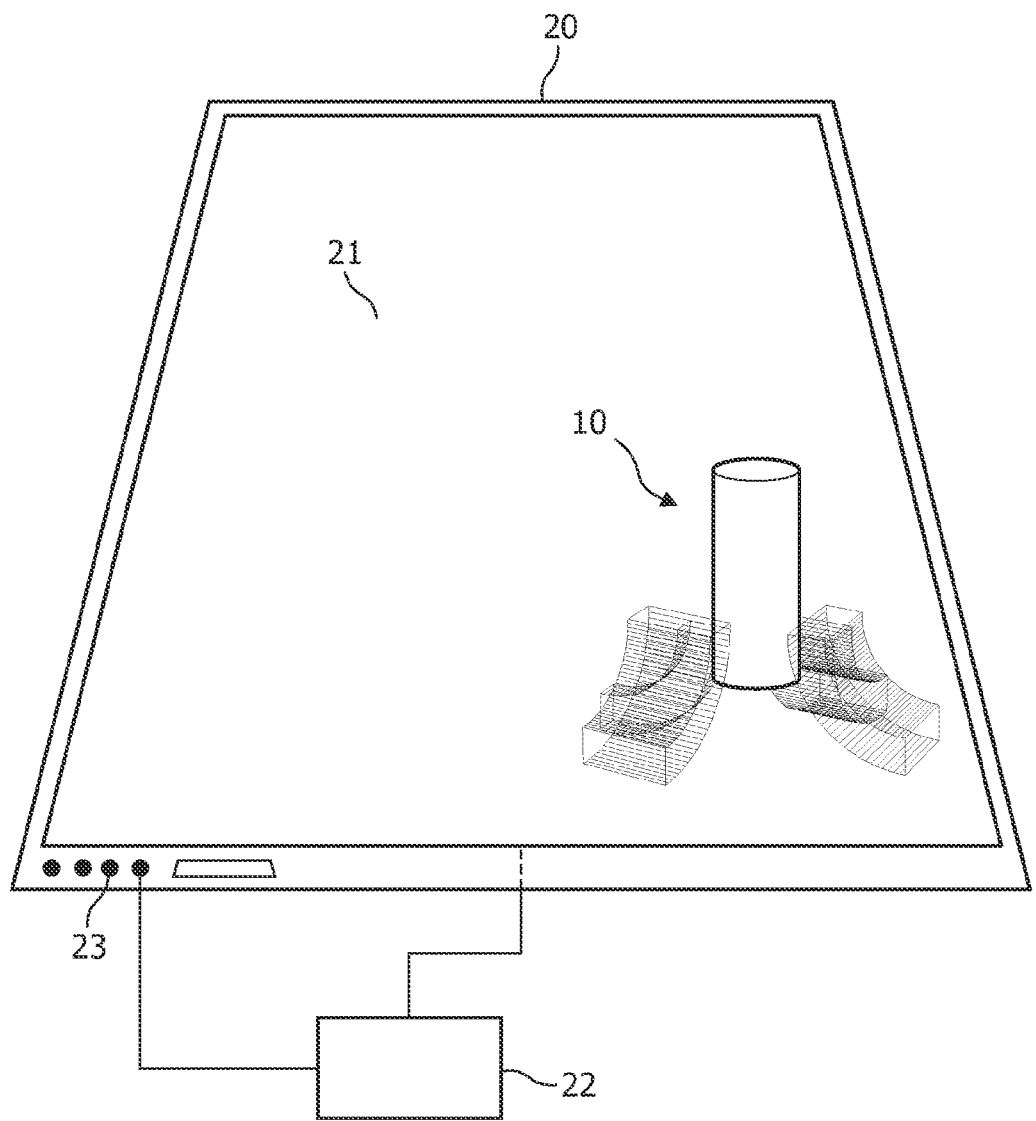
FIG. 2 schematically shows a system according to the invention.

FIG. 2 schematically shows a system 20 according to the invention. The pointing device 10 is placed on an interactive surface 21 of the interactive system 20. The interactive system 20 is capable of detecting the presence of objects on the interactive surface 21. Well known technologies for detecting the presence of the objects are known from, e.g., resistive, capacitive or infrared (multi-)touch screen panels and camera based optical imaging solutions. The interactive system 20 further comprises electronic circuitry, a processor 22 or a computer for performing the processing tasks related to the operation of the interactive system 20. The interactive system 20 may further comprise user interface elements 23 for enabling interaction between the user and the interactive system 20. The processor 22 is coupled to the interactive surface 21 and the user interface elements 23.

Preferably, the interactive surface 21 also functions as a display screen. For example, the interactive system 20 may be an interactive system with full PC functionality, the interactive surface being a display screen of the PC. The combination of normal PC functionality and the touch screen functionality of the interactive surface 21 provides for many new and interesting applications. Alternatively, the interactive system may be a touchpad or the like of a laptop PC. The pointing device 10 according to the invention may be a very practical, cordless pointing device for such a laptop. Its functioning does only rely on mechanical forces and does not need any power supply, or electrical communication measures.

Figure 3:
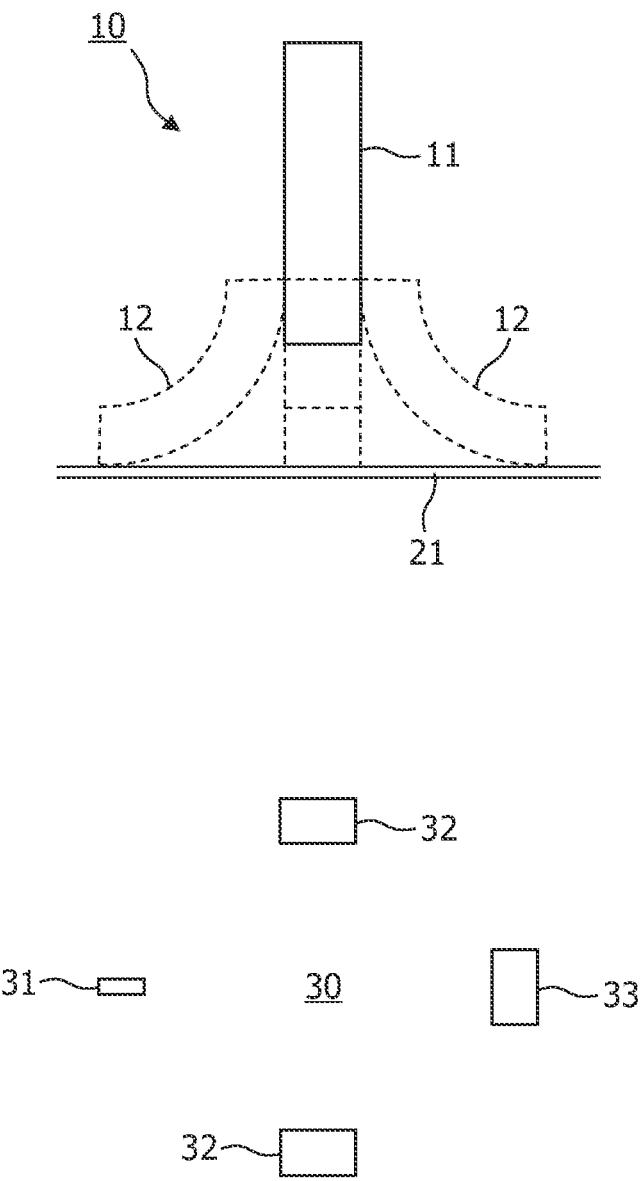
FIG. 3 shows a cross section and a corresponding footprint of the pointing device of FIG. 1 in a neutral position.

FIG. 3 shows a cross section and a corresponding footprint 30 of the pointing device 10 of FIG. 1 in a neutral position. The four curved legs 12 rest on the interactive surface 21. The positions where the legs 12 touch the interactive surface 21 form the footprint 30 that is detected by the interactive system 20. Preferably, like in this figure, the footprint 30 is not rotational symmetric. One of the legs 12 is smaller than the other legs 12 and therefore results in a smaller contact area 31 at the interactive surface 21. This enables the interactive system 20 to determine the orientation of the pointing device 10 and thus allows the user to put the pointing device 10 on the interactive surface 21 in any desired orientation. In FIG. 3, the contact area 31 of the smaller leg 12 defines the forward direction. Pushing the grip portion 11 in the direction of the smaller leg 12 will result in a forward directional command, no matter the orientation of the pointing device 10 on the interactive surface 21. Especially when the grip portion 11 comprises a hand profile, it is important that all directions are defined relative to the pointing device 10 and not relative to the interactive surface 21. Also, if the joystick is used at different sides of an interactive tabletop surface, it is important that the system reacts meaningfully in accordance to the user's position and perspective. In the neutral position as shown in FIG. 3, the pointing device 10 provides no directional commands.

Figure 4:
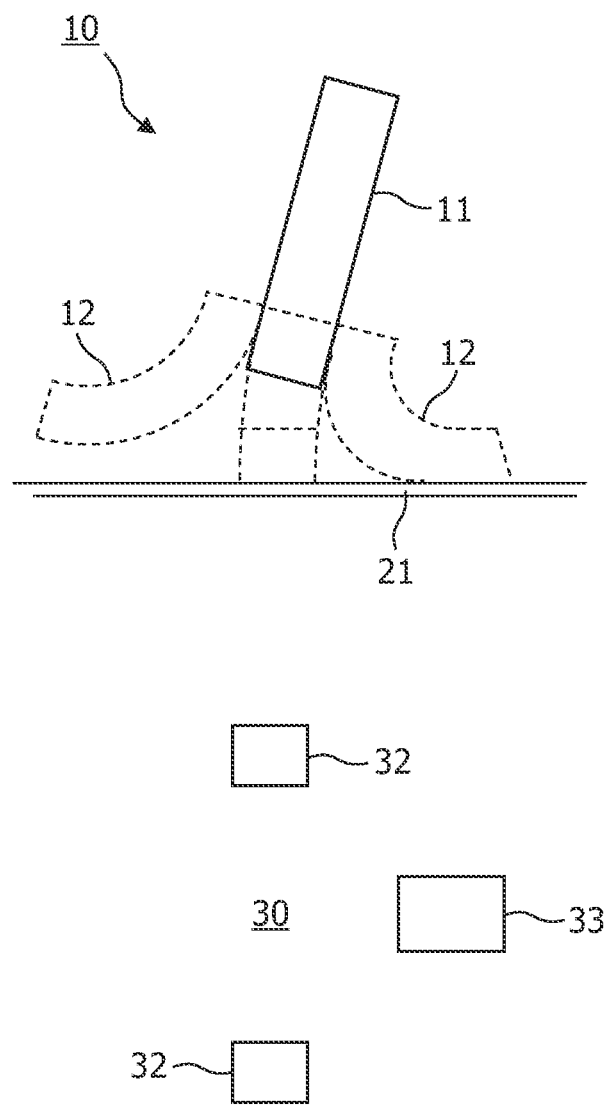
FIG. 4 shows a cross section and a corresponding footprint of the pointing device of FIG. 1 in a non-neutral position.

FIG. 4 shows a cross section and a corresponding footprint 30 of the pointing device 10 of FIG. 1 in a non-neutral position. Here, the grip portion 11 has been pulled backwards. As a result, the flexible legs 12 are bended and deformed. As the shapeable part 12 of the pointing device 10 is deformed, the footprint 30 of the contact surface 21 changes accordingly. The front leg 12 looses contact with the contact surface 21 and the contact area 31 disappears. The deformation of the rear leg 12 results in the contact area 33 of the rear leg 12 with the contact surface 21 becoming larger than in the neutral position of FIG. 3. In the situation of FIG. 4, with the grip portion 11 pulled backwards, the contact areas 32 of the side legs 12 are more or less the same as in the neutral position of FIG. 3. However, if the grip portion 11 is pushed or pulled to the left or right, those contact areas 32 will significantly change or even disappear. This pointing device 11 is not only suitable for detecting manipulation of the grip portion 11 into the forward, backward, left and right directions, but also in all direction in between those four directions. Each direction results in another characteristic footprint 30 that can be detected by the interactive system 20. It is to be noted that the characteristics of the footprint 30 do not only depend on the direction of manipulation of the grip portion 11, but also on the extent of manipulation. The further the grip portion 11 is pushed or pulled in a direction, the bigger the effect on the shape of the footprint 30. Additionally, the system could also register if the whole joystick is pressed downwards onto the surface (for example to select an object)—in which case all four contact surfaces will be deformed, or when the joystick is (briefly) lifted from the surface.

The interactive system 20 may use one or more different approaches to determine which directional command the user intended to give. For determining the directional command, the interactive system 20 detects some characteristics of the footprint 30. The system 20 may determine the exact shape of the footprint 30, calculate the total area of the footprint 30 and/or determine the distance between the different contact areas 31, 32, 33 of the footprint 30. Preferably, a combination of these approaches is used for achieving optimal accuracy.

Figure 5:
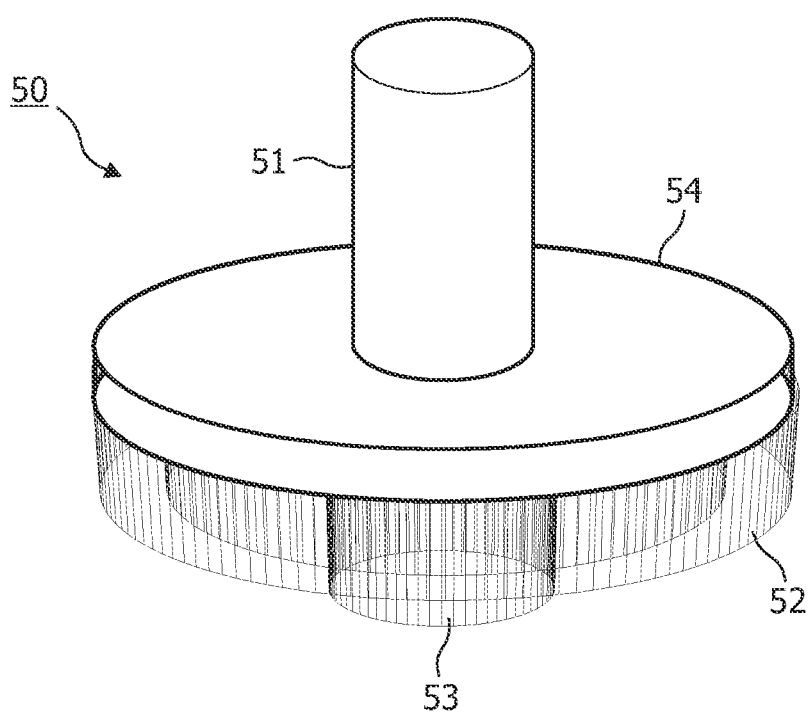
FIG. 5 shows a different embodiment of the pointing device according to the invention.

FIG. 5 shows a different embodiment of the pointing device 50 according to the invention. This pointing device 50 also comprises a grip portion 51 that may be provided with a hand profile. The grip portion 51 is coupled to the shapeable part 52, 53, via a disc 54. A ring 52 of flexible material is attached to the circumference of the disc 54. At the centre of the disc 54, a cylindrical support member 53 for supporting the pointing device 50 on the interactive surface 21. The support member 53 may be made of the same material as the ring 52, but also other materials may be applied. As will be further elucidated below, with reference to FIGS. 6a and 6b, it is important that the support member 53 is bendable. The support member 53 may further comprise a spring for giving the pointing device 50 a more natural spring lever feeling. Such a spring will automatically bring the pointing device 50 back into a neutral position when no force is applied to the grip portion 51. The contact surface of the support member 53 may comprise some special material or a suction nap for preventing slipping of the support member over the interactive surface 21.

Figure 6A:
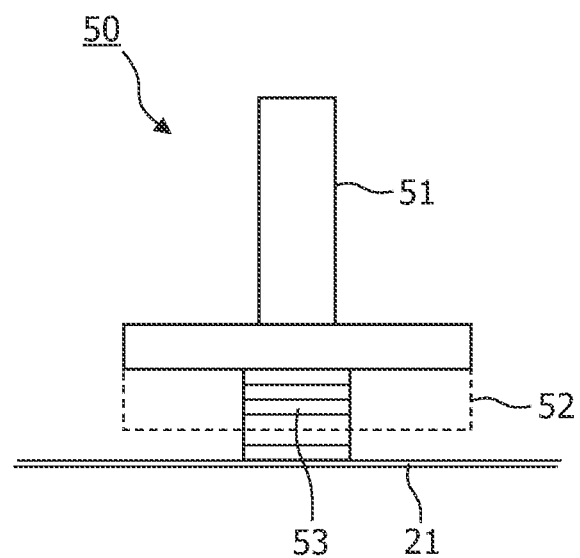
FIGS. 6a and 6b show cross sections and footprints of the pointing device of FIG. 5 in different positions.
Figure 6A:
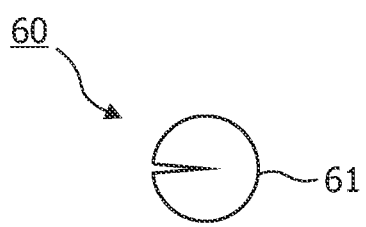
Figure 6B:
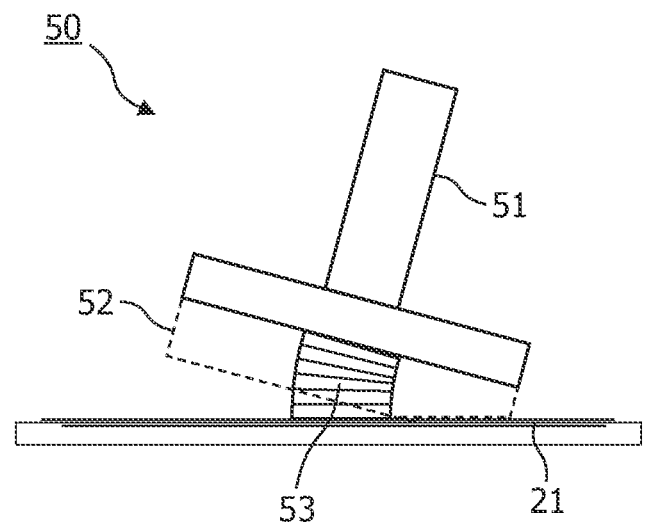
Figure 6B:
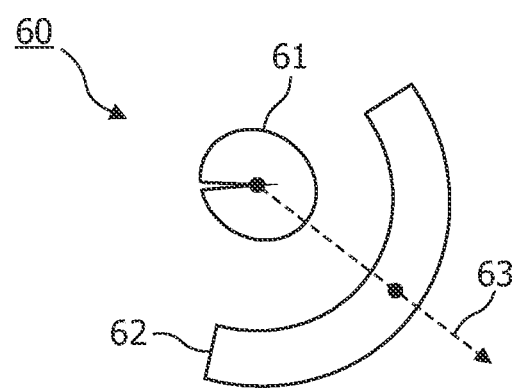

FIGS. 6a and 6b show cross sections and footprints 60 of the pointing device 50 of FIG. 5 in different positions. As can be seen in the footprint 60, the support member 53 is not completely rotational symmetric in order to enable the system 20 to detect the orientation of the pointing device 50. In FIG. 6a, the pointing device 50 is in a neutral position. The pointing device 50 rests on the support member 53. The height of the ring 52 is such that the ring 52 does not touch the interactive surface 21. Consequently, the footprint 60 is formed by the contact surface of the support member 53 only.

In FIG. 6b, the grip portion 51 has been pushed (or pulled) into some direction. The flexible support member 53 bends in the same direction as the grip portion 51 is pushed. As a result, the ring 52 touches the interactive surface 21. As soon as the ring 52 touches the interactive surface 21, the ring 52 gets compressed. When the grip portion 51 is pushed further away from the neutral position, the ring 52 will be more compressed and the contact area 62 of the ring 52 on the surface 21 will be larger. The area of the footprint 60 thus is a measure for a distance from the neutral position. A straight line 63 through the centre of the contact area 61 of the support member and the contact area 62 of the ring defines the direction to which the grip portion 51 is pushed by the user.

Figure 7:
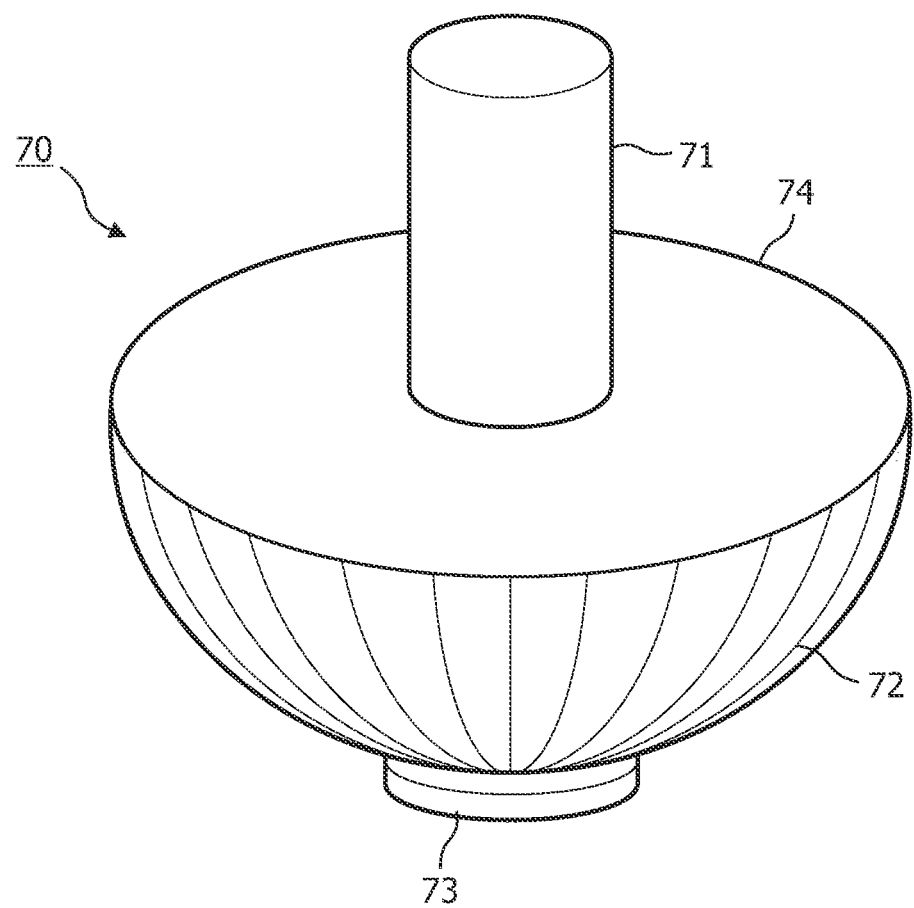
FIG. 7 shows another different embodiment of the pointing device according to the invention.

FIG. 7 shows another different embodiment of the pointing device 70 according to the invention. This embodiment may comprise a similar grip portion 71 and disc 74 as comprised in the embodiment shown in FIG. 5. The shapeable part of the pointing device 70 of FIG. 7 consists of a half sphere dome 72 of flexible material. A suction nap 73 or other means for providing slipping away may be provided.

Figure 8A:
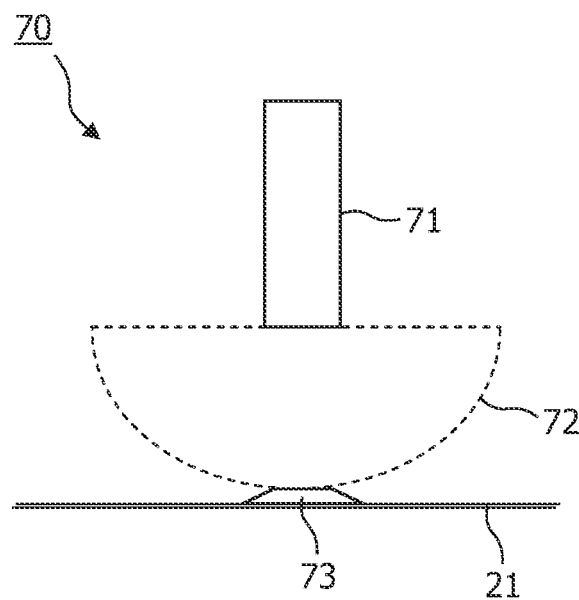
FIGS. 8a and 8b show cross sections and footprints of the pointing device of FIG. 7 in different positions.
Figure 8A:
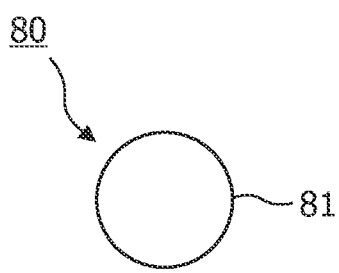
Figure 8B:
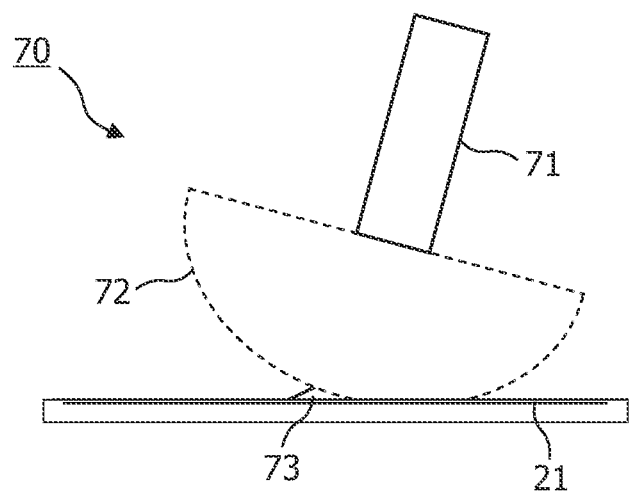
Figure 8B:
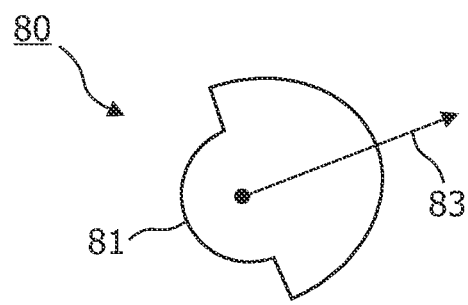

FIGS. 8a and 8b show cross sections and footprints 80 of the pointing device 70 of FIG. 7 in different positions. In all positions, the footprint 80 comprises a single contact area 81. The shape, position, orientation and area of the contact area 81 characterize the position of the grip portion 71. Of course, the suction nap 73 may have a non rotational symmetric shape like, e.g., already shown in FIG. 6. The total area of the footprint 80 characterizes the distance from the neutral position. The direction 83 in which the grip portion 17 is pushed or pulled is obtained by analyzing the shape of the footprint 81 (same area at both sides of arrow 83).

Figure 9:
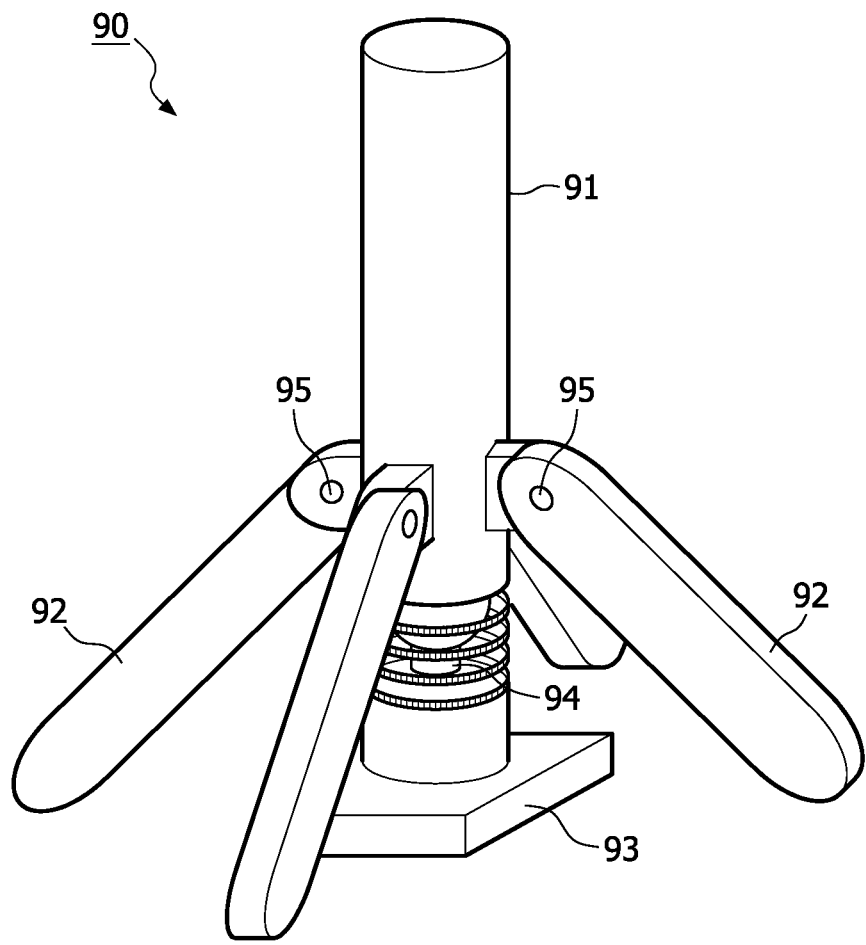
FIG. 9 shows an embodiment of the pointing device according to the invention, using rigid members and flexible links.

FIG. 9 shows an embodiment of the pointing device 90 according to the invention, using rigid members 92 and flexible links 95. This embodiment does not need flexible, soft materials for the shapeable part. Here, the shapeable part comprises several rigid members 92 that are moveable relative to each other because they are coupled via flexible links 95, such as hinges. The pointing device 90 comprises a grip portion 91, possible with a hand profile. The grip portion 91 is coupled to a support member 93 for supporting the pointing device 90 on the interactive surface 21. The coupling between the grip portion 91 and the support member 93 is such that the grip portion 91 can be manipulated into different directions and positions. For example, the coupling between the grip portion 91 and the support member 93 is provided by a combination of a ball joint and a spring 94. The spring 94 in this pointing device may be such that the grip portion 91 returns to the neutral position whenever the user does not exert any forces to the grip portion 91.

Figure 10A:
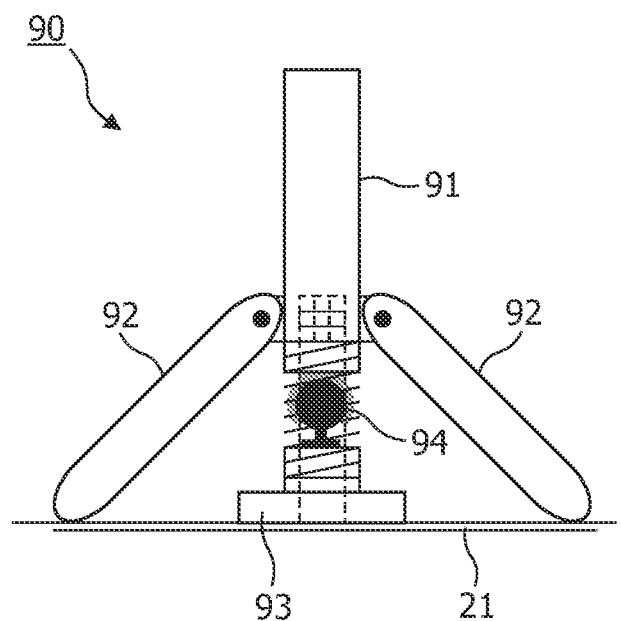
FIGS. 10a and 10b show cross sections and footprints of the pointing device of FIG. 8 in different positions.
Figure 10A:
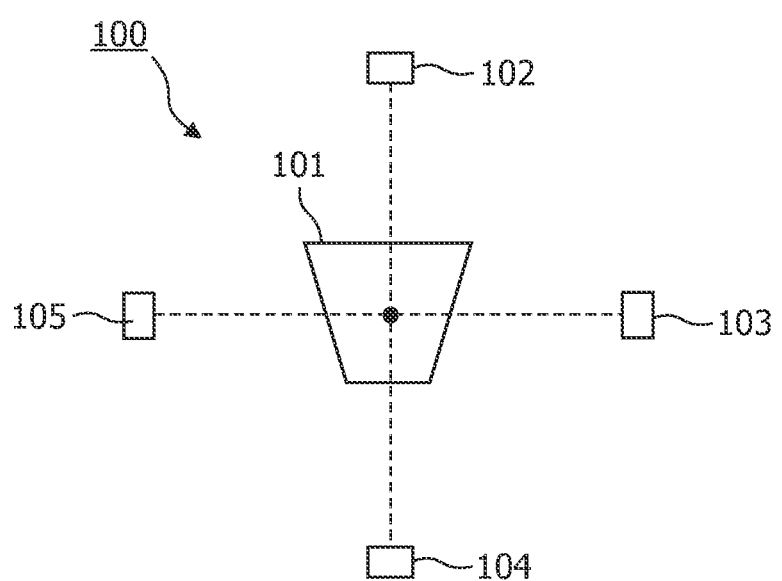
Figure 10B:
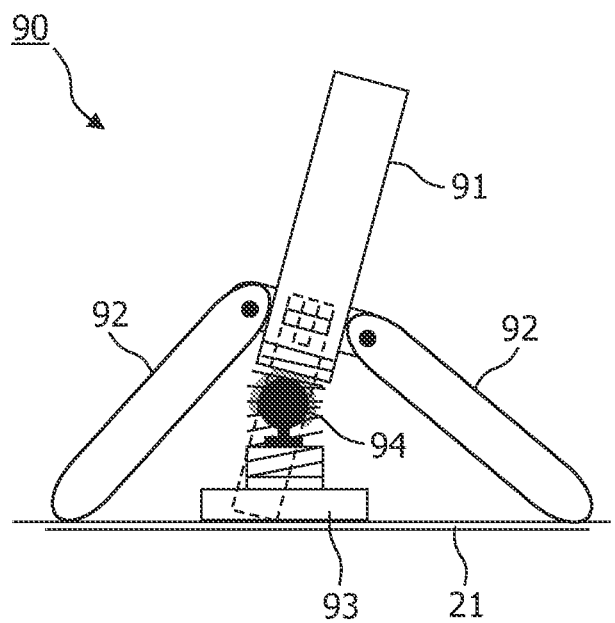
Figure 10B:
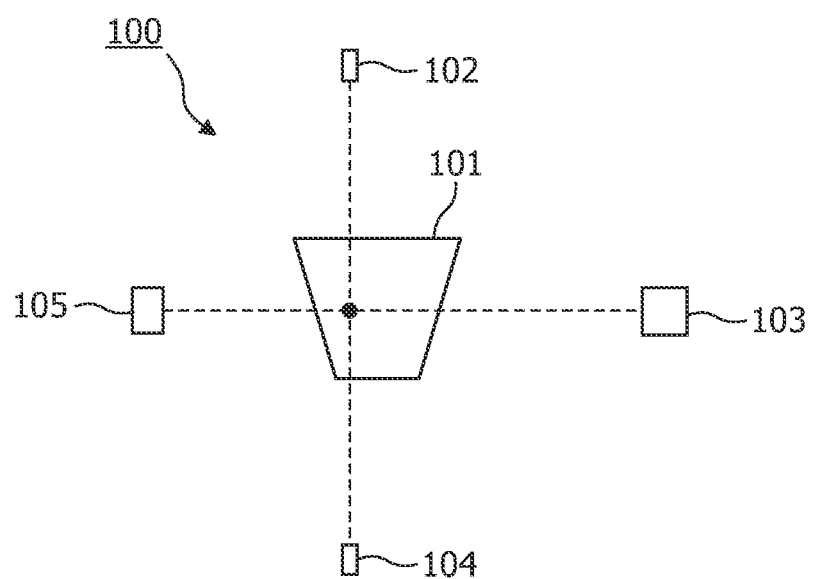

FIGS. 10a and 10b show cross sections and footprints 100 of the pointing device of FIG. 9 in different positions. In the neutral position of FIG. 10a, all four rigid members make contact with the interactive surface 21 at the same distance from the centre of the support member 93. As can be seen in the footprint 100, the contact area 101 of the support member 93 is such that the orientation of the pointing device 90 relative to the interactive surface 21 can be determined. When the grip portion 91 is pulled or pushed (FIG. 10b), the support member 93 remains at the same position on the interactive surface 21 and the rigid members 92 slide over the surface to take new positions. By analyzing the positions of the contact areas 102-105 of the rigid members 92, the position of the grip portion can be determined. E.g., the point of intersection of the lines connecting opposite contact areas 102, 104 and 103, 105 characterizes the position of the grip portion 91. Alternatively, the distances to the centre of the support member may be used. It is to be noted that also the area of the contacts between the rigid members 92 and the interactive surface 21 may change when the grip portion is pushed or pulled.

A pointing device like the one of FIG. 9, may also be provided with more or less than four rigid members 92. A pointing device with one rigid member 92 may be used for detecting directional commands in one dimension. For 2D detection, at least two rigid members 92 are required.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A pointing device for use on an interactive surface, the pointing device comprising:
   a grip portion for allowing manipulation into different positions, relative to the interactive surface, by a user, and
   a shapeable part with a non rotationally symmetric contact surface contacting the interactive surface,
   the grip portion being coupled to the shapeable part wherein manipulation of the grip portion into one of the different positions causes a footprint of the contact surface on the interactive surface to take a different shape corresponding to the respective position of the grip portion.

2. The pointing device as claimed in claim 1, wherein the shapeable part comprises flexible material.

3. The pointing device as claimed in claim 2, wherein the shapeable part comprises at least three curved legs of the flexible material, one end of each leg being attached to the grip portion, another end of each leg comprising a part of the contact surface.

4. The pointing device as claimed in claim 2, further comprising a supporting element for resting on the interactive surface and wherein the shapeable part comprises a ring of the flexible material, the supporting element being situated inside the ring arid the ring being arranged in such a way that the contact surface:
   is just above the interactive surface when the pointing device is in a neutral position,
   partly contacts the interactive surface when the pointing device is in a non neutral position.

5. The pointing device as claimed in claim 2, wherein the shapeable part is a half-sphere dome of the flexible material.

6. The pointing device as claimed in claim 2, wherein the flexible material is bendable foam.

7. The pointing device as claimed in claim 1, wherein the shapeable part comprises at least one rigid member, the rigid member comprising at least a part of the contact surface and being coupled to the grip portion by a flexible link.

8. The pointing device as claimed in claim 7, wherein the flexible links are hinges.

9. The pointing device as claimed in claim 1, wherein at least a part of the contact surface comprises attachment means for preventing slipping of the contact surface over the interactive surface.

10. The pointing device as claimed in claim 9, wherein the attachment means is a rubber strip.

11. The pointing device as claimed in claim 9, wherein the attachment means is a suction nap.

12. The pointing device of claim 1 wherein the different positions of the grip portion have different respective angles with respect to an axis perpendicular to the interactive surface.

13. The pointing device of claim 1 wherein the different positions of the grip portion cause the shapeable part to take on different respective positions with respect to the grip portion which in turn causes the footprint between the shapeable part and the interactive surface to take on different respective shapes.

14. An interactive system comprising:
    a pointing device comprising:
       a grip portion for allowing manipulation into different positions, relative to the interactive surface, by and user, and
       a shapeable part with a non rotationally symmetric contact surface contacting the interactive surface,
       the grip portion being coupled to the shapeable part wherein manipulation of the grip portion into one of the different positions causes a footprint of the contact surface on the interactive surface to take a different shape corresponding to the respective position of the grip portion;
    an interactive surface,
    means for determining characteristics of the footprint of the contact surface of the shapeable part of the pointing device on the interactive surface, and
    means for determining of a position of the grip portion of the pointing device based on the characteristics of the footprint.

15. An interactive system as claimed in claim 14, wherein the means for determining characteristics of the footprint are arranged for determining a distance between separate parts of the footprint.

16. An interactive system as claimed in claim 14, wherein the means for determining characteristics of the footprint are arranged for determining an area of the footprint.

17. An interactive system as claimed in claim 14, wherein the means for determining characteristics of the footprint are arranged for determining a shape of the footprint.

18. A method for determining a position of a grip portion of a pointing device comprising:
    a grip portion for allowing manipulation into different positions, relative to an interactive surface, and
    a shapeable part with a non rotationally symmetric contact surface contacting the interactive surface,
    the grip portion being coupled to the shapeable part wherein manipulation of the grip portion into one of the different positions causes a footprint of the contact surface on the interactive surface to take a different shape corresponding to the respective position of the grip portion, the method comprising:
    determining characteristics of the footprint of the contact surface of the shapeable part of the pointing device on the interactive surface,
    determining the position of the grip portion based on the characteristics of the footprint.

19. A method for receiving input from a pointing device comprising:
    a grip portion for allowing manipulation into different positions, relative to the interactive surface, by a user, and
    a shapeable part with a non rotationally symmetric contact surface contacting the interactive surface,
    the grip portion being coupled to the shapeable part wherein manipulation of the grip portion into one of the different positions causes a footprint of the contact surface on the interactive surface to take a different shape corresponding to the respective position of the grip portion, the method comprising:
    determining characteristics of the footprint of the contact surface of the shapeable part of the pointing device on the interactive surface, and
    comparing the characteristics of the footprint to predetermined characteristics to determine a user input.

* * * * *